United States Patent [19]

Hatcher

[11] Patent Number: 4,893,112
[45] Date of Patent: Jan. 9, 1990

[54] BRAKE LIGHT AND RADAR DETECTION DEVICE

[76] Inventor: Howard R. Hatcher, 204 Barry Dr., Greer, S.C. 29651

[21] Appl. No.: 123,772

[22] Filed: Nov. 23, 1987

[51] Int. Cl.⁴ .............................................. B60Q 1/44
[52] U.S. Cl. .................................... 340/479; 340/468; 340/435; 180/167
[58] Field of Search ............... 340/904, 87, 479, 468, 340/435, 436; 342/20; 343/711, 713, 781 R, 834; 180/167

[56] References Cited

U.S. PATENT DOCUMENTS 4,293,859 11/1981 Sergent ........................... 343/781 R
4,471,411 4/1984 Graham et al. ...................... 340/87
4,631,516 12/1986 Clinker ................................ 340/76
4,724,515 2/1988 Matsuki ............................... 340/87

Primary Examiner—Donnie L. Crosland
Attorney, Agent, or Firm—Cort Flint

[57] ABSTRACT

A brake light and radar detection device (A) is disclosed which includes a brake light unit (B), a radar detection unit (C), and a radar receiving unit (D). A housing (16) includes a horizontal housing (18) and a vertical support housing (20) for elevating housing (18). Radar detector unit (C) is included in vertical housing (20) and radar receiving unit (D) is included in horizontal housing (18) opposite brake light unit (B). A reflector (54) of radar receiver unit (D) gathers and reflects radar waves (56) to vertical waves (58) for impingement upon radar detector (C).

14 Claims, 3 Drawing Sheets

BRAKE LIGHT AND RADAR DETECTION DEVICE

BACKGROUND OF THE INVENTION

The invention relates to radar detection devices and more particularly to the combination of a radar detection and a high-mount brake light wherein the radar detection unit is mouned to enhance its detection capabilities. The combination assembly also renders the radar detector less susceptible to theft and more cosmetically attractive. Conventional radar detectors have included a detector and a signaling device. The detector is typically mounted on the sun visor, above the dash, or behind the front grill of the automobile. The switching device may be located anywhere where it is readily visible. The visor mounted detectors are easily stolen and have also been criticized as unsafe since the detector may fall of the visor while driving. The detectors mounted remotely in the grill area of the automobile have the problem that the body of the automobile decreases the radar detection and may be adversely affected by weather conditions.

U.S. Pat. No. 4,624,210 discloses an interior rear view mirror of an automobile in which a radar detector may be mounted. In order to accommodate the fatness of the rear view mirror, the detector is made in a wide grid form reducing the effectiveness of the detector. The unit requires that a wire drops down from inside the vehicle, which, from a cosmetic and safety point of view is not entirely satisfactory. The device also remains highly susceptible to theft.

Accordingly, an object of the invention is to provide a device for mounting a radar detector which has increased detection capabilities, is safe, and is not readily susceptible to theft.

Another object of the invention is to provide a device which may be manufactured either in the form of a ready-made device or in a "kit" form for adapting a high-mount brake light to include a radar detector.

Still another object of the invention is to provide a combination radar detector and brake light of the high mount type which positions the detector in an enhanced position for radar detection, renders the mounting safe, and relatively unsusceptible to theft.

SUMMARY OF THE INVENTION

The above objectives are accomplished according to the present invention by including a radar detection unit in a high mount brake light unit to provide a combined brake light and radar detection device. In accordance with the invention, a radar receiver is placed in a housing of the brake light unit facing toward the front of the vehicle. A radar detector is mounted in a shaft of a support base of the brake light unit for receiving radar waves vertically. The radar receiver receives radar waves coming from a horizontal direction, gathers the radar waves, and redirects the radar waves in a vertical direction for impingement on the radar detector. In this manner, a radar detector unit is provided which has increased detection capabilities, is safe, and is relatively theft proof.

In another example of the invention, a standard brake light unit may be converted into a combined brake light and radar detection unit. This may include removing the original reflector and brake light to accommodate placement of the radar receiving unit. In this case, a modified brake light arrangement and light reflector may be included.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
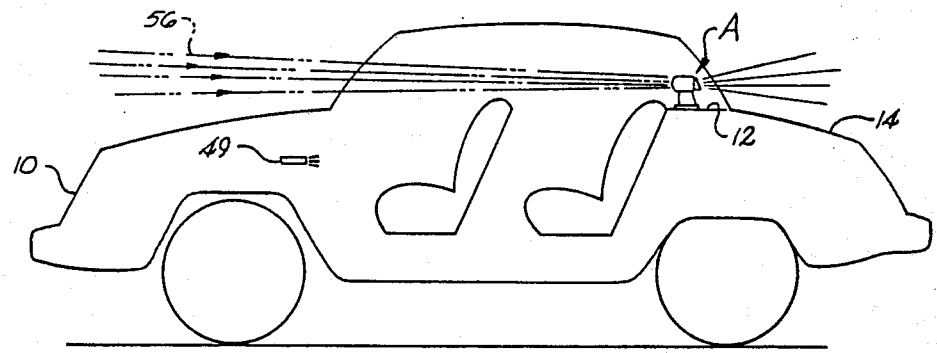
FIG. 1 is a side elevation illustrating a vehicle with a combination brake light/radar detector device in accordance with the invention.

Referring now in more detail to the drawings, a vehicle 10 is illustrated in FIG. 1 having a combination radar detector/brake light device designated generally as A constructed in accordance with the invention mounted inside the rear window of the vehicle. The device may be mounted to a package shelf 12 of the vehicle or may be trunk mounted to the trunk 14 or other suitable portion of the automobile.

Figure 5:
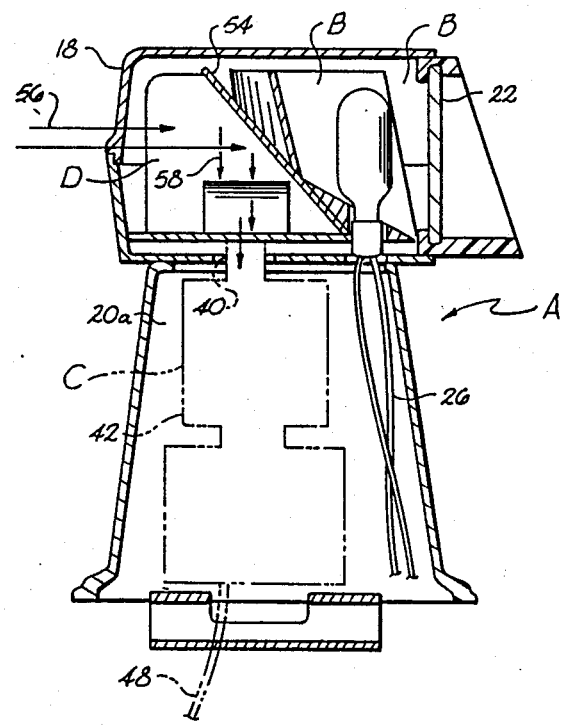
FIG. 5 is a sectional view taken along line 5—5 of FIG. 2.
Figure 2:
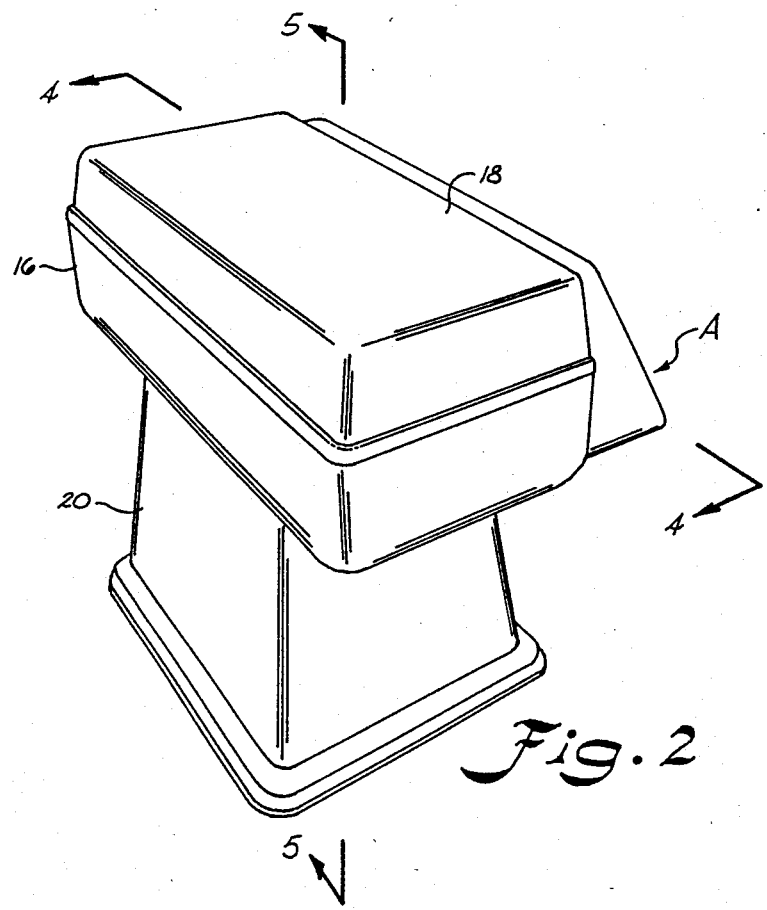
FIG. 2 is a perspective view of the device of the invention.

As can best be seen in FIGS. 2 and 5, the device includes a housing 16 including a generally horizontal housing 18 and a vertical base housing 20 which supports housing 18 in a elevated position. Vertical housing 20 provides a high support for the brake light making it more readily visible. Housing 16 may be mounted on shelf 12 or other vehicle support surface. A translucent brake light window 22 faces rearwardly. A brake light unit B may include any arrangement of lighting elements such as a pair of spaced bulbs 24 mounted in horizontal housing 18 and electrically connected by wires 26 extending inside vertical housing 20. It is to be understood, that any suitable arrangement of lighting may be provided for in brake light unit B. A reflector means 28 is provided for reflecting the light from elements 24. As illustrated, reflector means 28 is in the form of a double, concave reflector lens having reflectors 30 and 32 surrounding lights 24, as can best be seen in FIG. 4.

Figure 3:
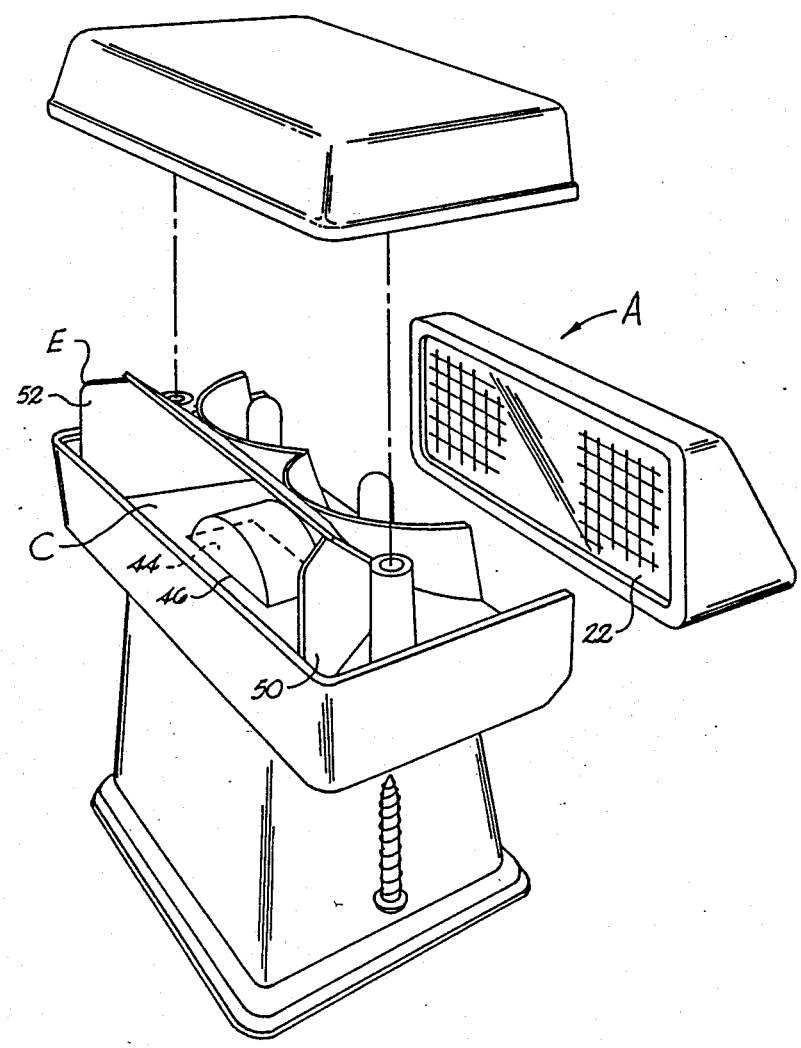
FIG. 3 is a perspective view with parts separated of a brake light/radar detector device of the high-mount type constructed in accordance with the invention.

As can best be seen in FIGS. 3 and 5, a radar detector unit C is carried in vertical shaft 20a of housing 20. Detector unit C may be any suitable radar detector such as a Whistler Spectrum II manufactured by Dymatech Corporation of Baltimore, Md. It is to be understodd, of course, that any suitable radar detector may be used. As illustrated, detector C includes a radar feed horn 40 which feeds radar detector circuitry shown schematically at 42. A passage 46 is formed between housing 16 and 18 for transmission of the radio or radar waves to feed horn 40 of detector C. The referened radar detector includes a focusing lens 44 which occupies passage 46 for focusing radar waves for effective impingement upon detector C. Passage 46, which is blank, may be employed without a focusing lens for passing radar waves to feed horn 40 and to the associated detection circuitry 42. Suitable wiring 48 may carry the detection signals to a suitable signaling unit 49 mounted at a convenient and effective position so that the driver of the automobile may readily see the signal display.

Figure 4:
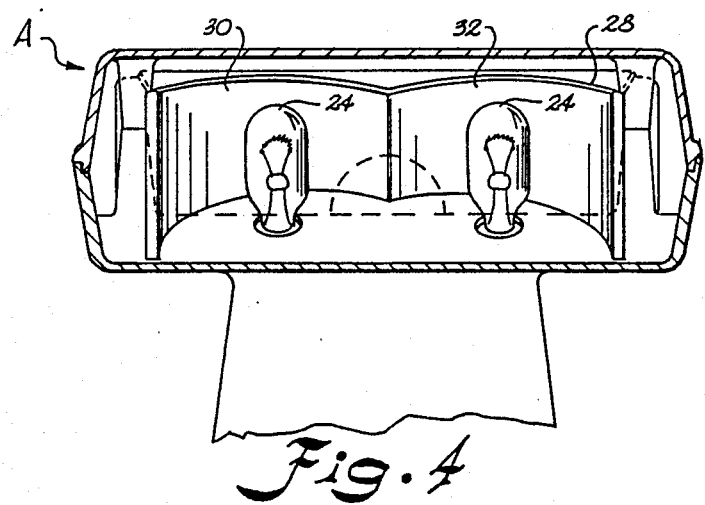
FIG. 4 is a sectional view taken along line 4—4 of FIG. 2.

In accordance with the invention, as can best be seen in FIGS. 3 and 4, there is a radar receiving unit D having a radar wave gathering means int he form of a reflector E. Reflector E has a pair of converging side surfaces 50, 52 and upper surface 54 which gather in the radiation and reflect it towards passage 46. Upper surface 54 is an inclined wall which bridges the converging sides 50 and 52. The design of converging surfaces 50, 52 and 54 effectively gathers and reflects radar waves received from the front end of the automobile, as shown by arrows 56 in FIG. 1, for impingement upon feed horn 40.

In "kit" form, it is contemplated that a standard brake light unit will be replaced with interchangable parts that will facilitate the installation of radar detector C. For example, a number of standard high-mount brake light units include a single bulb in the center of the housing. In order to mount the radar detector C and radar passage 46 in the center of the housing, it is necessary that this be modified. In accordance with the illustrated embodiment, this may be done by replacing the single bulb with a pair of bulbs 24 and replacing the conventional reflector with reflector 28. It is contemplated that the standard bulb and reflector will have to be replaced by interchangable parts when the invention is used in "kit" form to make room to accommodate placement of radar receiving unit D. Detector C may then be installed in vertical shaft 16a of base 16. Radar gathering reflector E is installed. Radio waves coming from front, generally horizontal direction 56 are redirected to a generally vertical direction 58 for effective impingement upon detector C carried for vertical reception.

While a preferred embodiment of the invention has been described using specific terms, such description is for illustrative purposes only, and it is to be understood that changes and variations may be made without departing from the spirit or scope of the following claims.

What is claimed is:

1. In a motor vehicle, a combination vehicle brake light and radar detection device for providing increased detection of radar waves emitted from a traffic speed radar unit and mounting to said motor vehicle in a generally theft-proof manner, said device comprising:
   a housing for mounting to said vehicle having a brake light compartment facing a rear of said vehicle with a translucent brake light window;
   means for mounting said housing to a surface of a vehicle;
   a radar detector for detecting said radar waves; and
   radar receiver means carried within said housing forward of said brake light compartment facing a front of said vehicle for receiving said radar waves coming from a direction forward of said vehicle, and delivering said radar waves to said radar detector.

2. The device of claim 1 wherein said receiver means includes a radar reflector for gathering and reflecting radar waves;
   a passage formed in said housing for transmission of said radar waves through said housing; and
   said reflector means reflecting and condensing said radar waves for transmission through said passage and impingement upon said detector means.

3. The device of claim 1 wherein said brake light means comprises:
   plural spaced apart brake lights defining a space between adjacent lights; and
   said radar detector being carried in said housing disposed for receiving radar waves approximate within said space between said lights.

4. The device of claim 3 including a light reflector for reflecting the illumination from said plural lights through said translucent brake light window wherein said reflector includes a pair of concave reflecting surfaces.

5. The device of claim 1 wherein said means for supporting said housing comprises a base housing having a vertical shaft; and
   a brake light housing carried atop said base housing.

6. The device of claim 5 wherein said radar detector means is carried in a vertical configuration within said vertical shaft of said base housing; and
   said radar receiver means carried in said brake light housing for redirecting said radar waves from a generally horizontal direction to a generally vertical direction for impingement upon said radar detector.

7. The device of claim 6 wherein said radar receiver means comprises a reflector for receiving said horizontal radar waves and for focusing said waves through said passage for transmission to said radar detector.

8. In a vehicle brake light unit of the type having a brake light housing for mounting to a surface of said vehicle, and said brake light housing including a brake light unit which includes a light reflector, brake light bulb, and brake light window facing rearwardly of said vehicle, the improvement comprising:
   a radar detector carried near said housing for detecting radar waves emitted from a traffic speed radar unit; and
   radar receiving means carried within said housing forward of said brake light compartment facing a front of said vehicle receiving said radar waves coming from a direction forward of said vehicle for gathering and focusing said radar waves for impingement upon said radar detector.

9. The device of claim 8 wherein said radar receiving means is disposed remotely from said radar detector in said housing and comprises a reflector for receiving and gathering said radar waves coming from a generally horizontal direction and reflecting said radar waves for impingement upon said radar detector.

10. The device of claim 9 wherein said reflector includes converging reflecting surfaces for receiving said radar waves from said generally horizontal direction and focusing said waves upon said radar detector.

11. The device of claim 8 wherein said brake light housing unit is of the type which includes a vertical base housing and a brake light housing carried on said vertical base, and wherein said improvement comprises:
   said radar detector being carried in a vertical shaft of said vertical base;
   a passage formed in said brake light housing; and
   said radar receiving means carried ins aid brake light housing for reflecting said radar waves through said passage for transmission to said radar detector.

12. Apparatus for converting a conventional high mount brake light having a brake light housing into a combined brake light unit/radar detector device for receiving and detecting radar waves emitted from a traffic speed radar unit, said brake light housing having a brake light unit with a reflector, light bulb, and brake light window facing rearwardly of said vehicle, said apparatus comprising:
- a radar detector adapted for mounting within a vertical shaft of said high mount brake light unit; and
- a radar receiver means adapted for being carried in said brake light housing forwardly of said brake light housing and above said radar detector, for receiving said radar waves coming from a generally horizontal direction and reflecting and transmitting said radar waves in a generally vertical direction through said vertical shaft to said radar detector.

13. The apparatus of claim 12 including means for converting said brake light unit from a single bulb unit to a plural bulb unit which includes a plurality of brake lights, and a light reflector for reflecting light from said plurality of brake lights.

14. The apparatus of claim 13 including a space defined between said plurality of said brake lights, a passage formed in said brake light housing for reflection and transmission of said radar waves by said radar receiver means, and said passage formed in said housing between said brake lights.

* * * * *